Oct. 7, 1969

KATUYUKI FUKUI 3,471,378

METHOD OF MANUFACTURING ELEMENTAL PART FOR DRY
TYPE ELECTROLYTIC CONDENSER
Filed April 8, 1966

Katuyuki Fukui,
INVENTOR.

BY Wenderoth, Lind and
Ponack,
Attorneys

United States Patent Office 3,471,378
Patented Oct. 7, 1969

3,471,378
METHOD OF MANUFACTURING ELEMENTAL PART FOR DRY TYPE ELECTROLYTIC CONDENSER
Katuyuki Fukui, Ayabe, Kyoto, Japan, assignor to Shinyei Co. Incorporation, Kobe, Japan
Filed Apr. 8, 1966, Ser. No. 541,194
Int. Cl. C23f *17/00;* C23b *5/50*
U.S. Cl. 204—38                                               7 Claims

ABSTRACT OF THE DISCLOSURE

Method of manufacturing an elemental part for a dry-type electrolysis condenser which involves the formation of an electrically insulating oxidized coating on the surface of a coating-forming metal by electrochemical means containing an electrolyte solution, such as ammonium borate or sulfuric acid, providing a laminated metal sheet on said oxidized coating, and then applying such voltage to said electrolyte solution as may not exceed a voltage required for the formation of said oxidized coating by operating said metal for coating formation as an anode and said electrolyte solution as a cathode respectively. The method removes any impurities present in the oxide dielectric layer.

---

Figure 1:
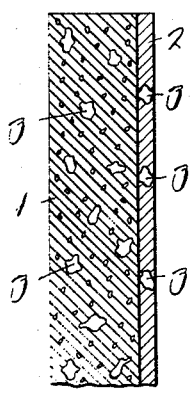

This invention relates to a method of manufacturing an elemental part for a dry type electrolysis condenser, consisting of an electrically insulating and extremely thin coating formed by oxidation on the surface of some metal for use as a dielectric and also to a condenser itself manufactured by this method.

An electric condenser is constructed in such a manner that positive charge and negative charge confront each other when an insulator is placed between two confronting conductors until electricity can be condensed in said confronting parts.

These conductors are made of a metal and the electric condensing capacity is determined by the size of surface of said confronting conductors and the thickness of said insulator, i.e. dielectric, namely the distance between said confronting conductors and the kind of dielectric.

From an electrical point of view, the above-mentioned metal is called an electrode and the maximum of electric condensing on the surface of an electrode is called capacity.

In general, condensers, small in size and large in capacity, can be manufactured by enlarging the surface area of two confronting electrodes and reducing the distance between them, namely, the thickness of a dielectric and selecting such a dielectric as may permit of easy passage of the line of electricity, namely, a large dielectric constant.

However, the enlargement of the area of two confronting electrodes is limited in practice depending on the purpose for which the condenser is used and hence, without relying on the problem of area alone, it is necessary to reduce the distance between the confronting electrodes by reducing the thickness of the dielectric or select such a dielectric as has a large dielectric constant.

This kind of dielectric is manufactured in the form of a laminated sheet by mechanical means. Besides, certain special metals are reacted electrochemically so that electrically insulating and extremely thin coating can be produced which may be used as a dielectric likewise. The so-called special metals are aluminum, niobium, tantalum and titanium of extremely high purity, i.e., the content of any other metals present in each of said metals is very small. Thus they are called coating-forming metals in general.

The condenser comprising a dielectric made of a coating formed by the above mentioned electrochemical reaction is called an electrolytic condenser. One kind of electrolytic condenser wherein said coating forming metal is present always in an electrolyte solution is called a wet type electrolytic condenser, whereas another kind having no electrolyte in liquid form is called a dry type electrolytic condenser.

In this case, oxygen in an electrolyte solution is ionized for transfer to the surface of a coating-forming metal, which is thus oxidized to produce an extremely thin and electrically insulating oxidized coating thereon.

However, because of heterogenous metal particles discretely present in said coating-forming metal, the surface of said metal can hardly be formed into a completely oxidized coating.

Namely, under the same conditions with said coating-forming metal, for example, the same oxidizing power, electrolyte solution, electrolytic voltage and electric current, it is impossible to form an oxidized coating because the portion of said heterogenous metal particles on the coating-forming metal may remain, as it is, without being subjected to oxidation with the result that there occurs some portion without formation of such coating.

Otherwise, because of crystalline condition of the atoms constituting the coating-forming metal, some impurities present in the electrolyte solution or some unknown factors in the oxidized coating, it is entirely impossible to use such a condenser as is provided with a dielectric using said oxidized coating formed by electrochemical means as it is.

From the necessity of overcoming this kind of drawback, it has been hitherto customary to apply an auxiliary coating of a metal peroxide made of manganese dioxide, lead peroxide or a semi-conductor onto said oxidized coating formed by electrochemical means to complete an integral layer thereby for utilizing a strongly oxidizing power attached to said auxiliary coating.

This procedure is considered proper due to the fact that the oxidizing and dissolving power of the above mentioned manganese dioxide, lead peroxide and semi-conductor serves to further oxidize the impurities in the oxidized coating which have not yet been oxidized by the electrolyte solution, so as to form a freshly oxidized coating thereon or dissolve said impurities, thereby eliminating the conductivity of said portion and maintaining the insulation property of said oxidized coating.

However, there arises the problem of electric polar property in this kind of condenser provided with an auxiliary coating made of manganese dioxide, lead peroxide, or a semi-conductor. When aluminum, niobium, tantalum or titanium is made a base material for formation of an oxidized coating, this base metal is caused to act as an electrode and the side of confronting laminated metal sheet disposed through the oxidized coating is caused to act as a cathode and only by this means, it is made possible to maintain the function of the condenser. However, the conversion of electric source and electrodes may result in changing the properties of voltage and current to a large extent and this tendency is generally called commutation. Namely when the side of the base metal is rendered a cathode and that of the laminated metal sheet is rendered an anode respectively, the function of the condenser will be lost after all. Therefore, such a condenser can be used only in the case of a direct current circuit so that the scope of its uses is not only limited extremely, but also there occur a loss of said dielectric in the condenser and additional resistance of said auxiliary layer so that overall electric losses are considerable, and moreover, such a condenser is affected by temperatures and frequencies to a great extent. To reduce these influences, various attempts have been made such as modification of the thickness of an auxiliary coating, replacement of the materials or entire elimination of such an auxiliary coating but all improvements in this regard find some limit more or less or other new problems would usually follow the results of so-called improvements. To sum up, it has been virtually difficult to overcome all afore-said defects perfectly and thus the manufacture of ideal condensers has been considered also impossible.

The present invention has for its objects to provide a condenser, small in size and high in efficiency, to cope with the general trend of development of various electronic apparatus and requirements for compact size of such apparatus. Namely the first object of the invention is to manufacture condensers, small in size and large in capacity. The second object thereof is to improve the electrical properties of a condenser at the time of its use, namely, to improve electrically internal losses and polar properties. The third object thereof is to manufacture an elemental part for a condenser from certain metals on the commercial market. The fourth object thereof is to simplify the manufacture of said elemental part for a condenser. The fifth object thereof is to manufacture condensers of long durability in use.

The present invention relates to a method of manufacturing condensers qualified well for achieving all the afore-said objects. According to this method, aluminum, tantalum, niobium or titanium is placed in an electrolyte solution as a base metal for the formation of a coating by electrolysis, and said base metal is rendered an anode while said electrolyte solution is rendered a cathode under these conditions. When electrifying the electrolyte solution, oxygen in the electrolyte is ionized for transfer in the direction of said base metal to form an extremely thin and electrically insulating oxidized coating on the surface of said base metal.

Along with the progress of formation of this coating, electric resistance tends to increase until electric current is decreased gradually and at length almost ceases to flow. At this point, the base metal is taken out from the electrolyte solution to find a coating on the surface thereof and then another laminated metal sheet is closely stuck to said coating and then this assembly is placed again in the electrolyte solution and also in this case, the base metal is rendered an anode while electrolyte solution is rendered a cathode, and then a voltage within a limit not exceeding that voltage, i.e., formation voltage necessary for the formation of said oxidized coating is applied to said electrolyte solution, so as to produce a dielectric for a condenser consisting of said oxidized coating.

The dielectric for a condenser manufactured in this manner, complete with the perfect correction of defective portions consisting of heterogenous metal particles on said oxidized coating, can be completed as a condenser by establishing a conductive terminal each at each side of the base metal and the laminated metal sheet respectively. This procedure will be explained in detail with reference to the accompanying drawings.

They are enlarged views in section showing a base metal for the formation of a coating, containing aluminum, niobium, tantalum or titanium in carrying out the procedures of the present invention.

FIG. 1 shows an oxidized coating obtained from said base metal in an electrolyte solution by electrochemical formation, wherein some particles 3 in heterogenous metal particles contained in the base metal extend onto the surface of said oxidized coating 2 from said base metal 1 through the layer of the oxidized coating, presenting itself to be a factor of defective portions.

Figure 2:
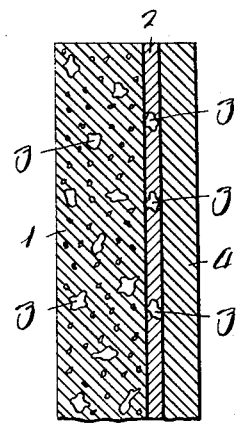

FIG. 2 shows a case where a laminated metal sheet 4 is closely stuck to the oxidized coating formed on the surface of base metal, and some impurities 3 present in the oxidized coating 2 are shown to range over the base metal 1 and the laminated metal sheet 4 indicating one bad example of electric insulation.

Figure 3:
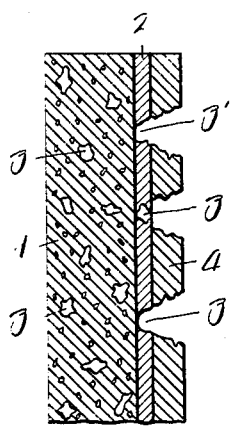

FIG. 3 shows a case where the laminated metal sheet 4 is fixed on the oxidized coating 2 and then this assembly is again placed in the electrolyte solution to whose medium a voltage is given to cause some variations therein and some of the impurities 3 present in the oxidized coating 2 leaves a trace 3' due to said voltage and is dispersed away with one part of the laminated sheet metal in place and some part thereof results in stripping away one part of the laminated metal sheet 4 in contact with the impurities 3, and thus, in either case both base metal 1 and laminated metal sheet do not come into direct contact with conductive particles, thus enabling electric insulation to be maintained thereby.

Figure 4:
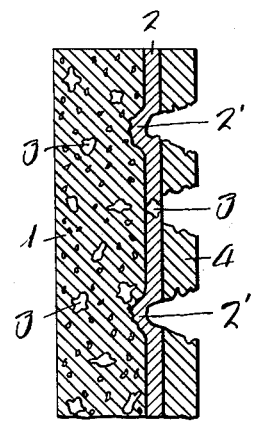

FIG. 4 shows the final procedure of the present invention where the impurities 3 present in the oxidized coating 2 are removed by voltage to leave the trace 3' into which the electrolyte solution is infiltrated and a freshly oxidized coating 2' is formed on said infiltrated portion. Since another oxidized coating is thus formed in the portion where the impurities have been removed, the loss of voltage due to corona discharge will be reduced.

According to the present invention, a coating-forming metal such as aluminum, tantalum, niobium and titanium of a medium or higher purity is previously reduced to a burnt body of various shapes such as a foil, sheet, rod or net and it is used as a base metal 1 which is then immersed in an electrolyte solution of boric acid, ammonium borate, phosphoric acid, sulphuric acid, acetic acid, or ammonium acetate in such concentration as is suitable for the material of said base metal 1.

In this case, the base metal 1 is operated as an anode and the electrolyte solution as a cathode for electrification so that oxygen in the electrolyte solution can be electrified as an anion for transfer in the direction of the base metal and bonded with the metal atoms of the surface of base metal to form an extremely thin, delicate, and electrically insulating oxidized coating 2 thereon. Consequently, as the formation of coating layer advances, the electric current for ionization is decreased gradually until at length it almost ceases to flow.

At this stage, the base metal 1 is taken out from the electrolyte so that the surface of said oxidized coating 2 as well as the entire surface of base metal is washed with warm water of such purity as distilled water containing no impurities. Immediately, it is dried satisfactorily and its oxidized coating is provided with a laminated sheet 4 of silver or some other metal up to a thickness of about $0.05$–$0.5\mu$ which is easy to process, namely, easy for conversion to a thin sheet, excellent in electric conductivity, difficult to be acted on by said electrolyte solution and chemically stable, by the method of vacuum steam adhesion, reduction plating or with an adhesive.

The assembly thus prepared is immersed again in the electrolyte solution and the base metal 1 is operated as an anode and the electrolyte solution as a cathode so that such voltage as may not damage the oxidized coating is imposed thereon by gradual increase within the limit of formation voltage required to form said oxidized coating.

In this manner, the electric current is caused to flow locally through extremely small impure particles 3 present in said coating and moreover while the electric current flows in wave form by gradual decrease in strength, electric resistance is so large, because of local electric current, that sufficient heat is generated to heat said impure particles 3 for a moment until they can be removed by evaporation or dispersion, together with the laminated metal sheet 4, leaving a trace 3' thereon, or in such a case where the impure particles have not yet been removed, one part only of the laminated metal sheet 4 in contact with the impurities 3 can be stripped off for removal. When this voltage reaches the required value, all the assembly is allowed to remain as it is and then the elctrolyte solution finds access to that portion where the impurities 3 have been removed, to form a freshly oxidized coating 2' by chemical means thereby making it a perfectly insulating oxidized coating.

At this stage, the electric current is reduced almost to leakage electric current and the base metal 1 is taken out from the electrolyte solution, washed with warm water of high purity and dried quickly for the purpose of manufacturing an elemental part for a condenser, according to the method of the present invention. The base metal 1 and the confronting laminated sheet metal 4 as elemental parts for a condenser are respectively provided with a conductive terminal by the use of an electrically conductive adhesive, welding or other pressing means. Then this assembly is housed in a casing, perfect in insulation and humidity-tightness and is hermetically sealed therein to introduce a durable electrolysis condenser, electrically perfect, small in size and large in capacity, having a dielectric of an oxidized coating without any auxiliary coating.

To substantiate the method of the present invention, one embodiment thereof will be explained hereinafter. A base metal for forming an oxidized coating is prepared in the form of an aluminum plate of purity 99.99%, 15×15 mm.$^2$ in size which is used as an anode and an aqueous solution of 3% ammonium borate in distilled water is used as an electrolyte solution for a cathode for electrification.

In this case, voltage is increased gradually until it reaches a maximum of 300 voltage and the assembly is allowed to stand still at this constant voltage for about 10–20 hours. Then the electric current is found to decrease until it almost ceases to flow, when, though imperfectly, an electrically insulating oxidized coating is formed on the surface of the base metal. When this condition is reached, the base metal is taken out from the electrolyte solution, immediately washed with warm water of 40°–50° C. obtained from distilled water and dried satisfactorily. On the oxidized coating thus prepared is provided a laminated sheet of silver up to about 0.1$\mu$ in thickness by the method of wet reduction plating and then, this assembly is immersed again in said electrolyte solution of ammonium borate so that voltage is increased by 3 volts per second while operating said aluminum plate as an anode and the electrolyte solution as a cathode respectively until it reaches a voltage of 250 as final and then, the assembly is allowed to stand still at this voltage for further 30 minutes to find a perfect correction of the defective portions on said oxidized coating. Then it is taken only again from the electrolyte solution and said aluminum plate and laminated sheet of silver are respectively provided with a terminal. This combination is housed in a casing, excellent in humidity-tightness and insulation, and is hermetically sealed therein, to obtain a condenser accordingly.

The electrical properties of the condenser thus obtained consist of an electrostatic capacity, 0.52 $\mu$F. (farad), dielectric loss angent, 0.8% and insulation resistance 2×10$^7 \Omega$ at 20° C. and alternating current of frequency 1,000 cycles. Still more, this condenser is found to operate in normal condition even at reverse voltage without losing its correct function, and is proved to be one of by far a higher capacity than those of prior art.

Thus it is made possible to manufacture condensers of a dielectric of an oxidized coating only which has been the problem of this industry remaining unsolved for quite a long period of time. Namely, according to the method of the present invention, very ideal electrolysis condensers can be manufactured in a simple manner, with their properties greatly improved, small in size, large in electric capacity, lasting long in durability and seldom lowering in function, as compared with conventional ones in every respect.

In passing, exactly the same effect as mentioned above can be obtained also by using any electrolyte solution of boric acid, phosphoric acid, sulphuric acid, acetic acid, ammonium acetate, sodium nitrate or potassium nitrate other than that used in the afore-said embodiment.

What is claimed is:
1. In the method of making an elemental part for a dry type electrolytic condenser wherein said part is formed by anodizing a film-forming metal to provide an oxide coating thereon acting as a dielectric layer and a thin film metal layer is deposited thereon to act as counter electrode and thus form a part comprising a film-forming metal layer, a dry electric oxide layer, and a metal counter electrode; the improvement wherein said part is connected as anode opposite a cathode in an electrolytic cell containing an electrolyte, said anodic connection being made at the film-forming metal layer, and said part is anodized at a voltage not to exceed that required for formation of said dielectric oxide layer, whereby any impurities present in the oxide dielectric layer are removed.

2. Method as set forth in claim 1, comprising using aluminum or niobium as the film forming metal.

3. Method as set forth in claim 1, comprising using boric acid and ammonium borate as an electrolyte solution.

4. Method as set forth in claim 1, comprising using sulphuric acid as an electrolyte solution.

5. Method as set forth in claim 1, comprising using acetic acid and ammonium acetate as an electrolyte solution.

6. Method as set forth in claim 1, comprising using ammonium carbonate as an electrolyte solution.

7. Method as set forth in claim 1, comprising using a mixture of sulphuric acid and ethylene glycol as an electrolyte solution.

References Cited
UNITED STATES PATENTS

| | | |
|---|---|---|
| 2,930,951 | 3/1960 | Burger et al. |
| 2,949,411 | 8/1960 | Beck _____ 204—56 |
| 3,079,536 | 2/1963 | McLean _____ 204—38 XR |
| 3,223,601 | 12/1965 | George _____ 204—56 |
| 3,239,436 | 3/1966 | Hagiwara et al. __ 204—39 XR |

JOHN H. MACK, Primary Examiner

G. L. KAPLAN, Assistant Examiner

U.S. Cl. X.R.

204—29, 42, 56